INVENTOR.
JAMES J. SCHELL
BY
Samuel Cohen
Attorney

| | 1 | | 2 | | 3 | | 4 | | 5 | | 6 | | 1 | |
|---|---|---|---|---|---|---|---|---|---|---|---|---|---|---|
| D | 0 | 1 | 0 | 1 | 0 | 1 | 0 | 1 | 0 | 1 | 0 | 1 | 0 | 1 |
| A | 1 | 1 | 0 | 0 | 1 | 1 | 0 | 0 | 1 | 1 | 0 | 0 | 1 | 1 |
| $\bar{A}$ | 0 | 0 | 1 | 1 | 0 | 0 | 1 | 1 | 0 | 0 | 1 | 1 | 0 | 0 |
| B | 0 | 1 | 0 | 0 | 0 | 1 | 0 | 0 | 0 | 1 | 0 | 0 | 0 | 1 |
| C | 0 | 0 | 0 | 1 | 0 | 0 | 0 | 1 | 0 | 0 | 0 | 1 | 0 | 0 |
| $T_0$ | 1 | 1 | 1 | 0 | 0 | 0 | 0 | 0 | 0 | 0 | 0 | 0 | 1 | 1 |
| $T_1$ | 0 | 0 | 1 | 1 | 1 | 0 | 0 | 0 | 0 | 0 | 0 | 0 | 0 | 0 |
| $T_2$ | 0 | 0 | 0 | 0 | 1 | 1 | 1 | 0 | 0 | 0 | 0 | 0 | 0 | 0 |
| $T_3$ | 0 | 0 | 0 | 0 | 0 | 0 | 1 | 1 | 1 | 0 | 0 | 0 | 0 | 0 |
| $T_4$ | 0 | 0 | 0 | 0 | 0 | 0 | 0 | 0 | 1 | 1 | 1 | 0 | 0 | 0 |
| $T_5$ | 1 | 0 | 0 | 0 | 0 | 0 | 0 | 0 | 0 | 0 | 1 | 1 | 1 | 0 |
| E | 1 | 0 | 0 | 0 | 0 | 0 | 0 | 0 | 0 | 0 | 0 | 0 | 1 | 0 |
| F | 0 | 0 | 1 | 0 | 0 | 0 | 0 | 0 | 0 | 0 | 0 | 0 | 0 | 0 |
| G | 0 | 0 | 0 | 0 | 1 | 0 | 0 | 0 | 0 | 0 | 0 | 0 | 0 | 0 |
| H | 0 | 0 | 0 | 0 | 0 | 0 | 1 | 0 | 0 | 0 | 0 | 0 | 0 | 0 |
| I | 0 | 0 | 0 | 0 | 0 | 0 | 0 | 0 | 1 | 0 | 0 | 0 | 0 | 0 |
| J | 0 | 0 | 0 | 0 | 0 | 0 | 0 | 0 | 0 | 0 | 1 | 0 | 0 | 0 |

Fig. 2.

INVENTOR.
JAMES J. SCHELL
BY Samuel Cohen
Attorney

United States Patent Office 3,327,225
Patented June 20, 1967

3,327,225

TIMING PULSE GENERATOR

James J. Schell, North Palm Beach, Fla., assignor to Radio Corporation of America, a corporation of Delaware Filed Mar. 1, 1965, Ser. No. 435,817
6 Claims. (Cl. 328—62)

This disclosure relates to a timing pulse generator which is useful, for example, in a digital computer. The generator includes a group of flip-flops driven by gates whose condition is controlled by the outputs of the flip-flops and by a periodic signal source.

An object of the invention is to provide a timing pulse generator which is capable of operating at relatively high speed, which is stable, and which uses relatively few circuit elements.

Another object of the invention is to provide a timing pulse generator which includes improved means for avoiding the generation of spurious output pulses.

The circuit of the invention includes a group of two-state circuits, for example, flip-flops, and a group of coincidence gates, one per two-state circuit, each gate connected to the same input terminal of its two-state circuit. Inputs are applied to each gate from two-state circuits other than the one to which the gate is connected for priming the successive gates in sequence. When a gate is primed, an enabling signal is applied to the gate for causing that gate to apply a signal to its two-state circuit for changing the state of that circuit from its first to its second state. Means coupled to the two-state circuits changes the state of each circuit from its second to its first state a predetermined interval after the preceding two-state circuit has switched to its second state.

The invenion is discussed in greater detail below and is shown in the following drawing, of which:

FIGURE 2 is a truth table describing the operation of the circuit of FIGURE 1.

Figure 1:
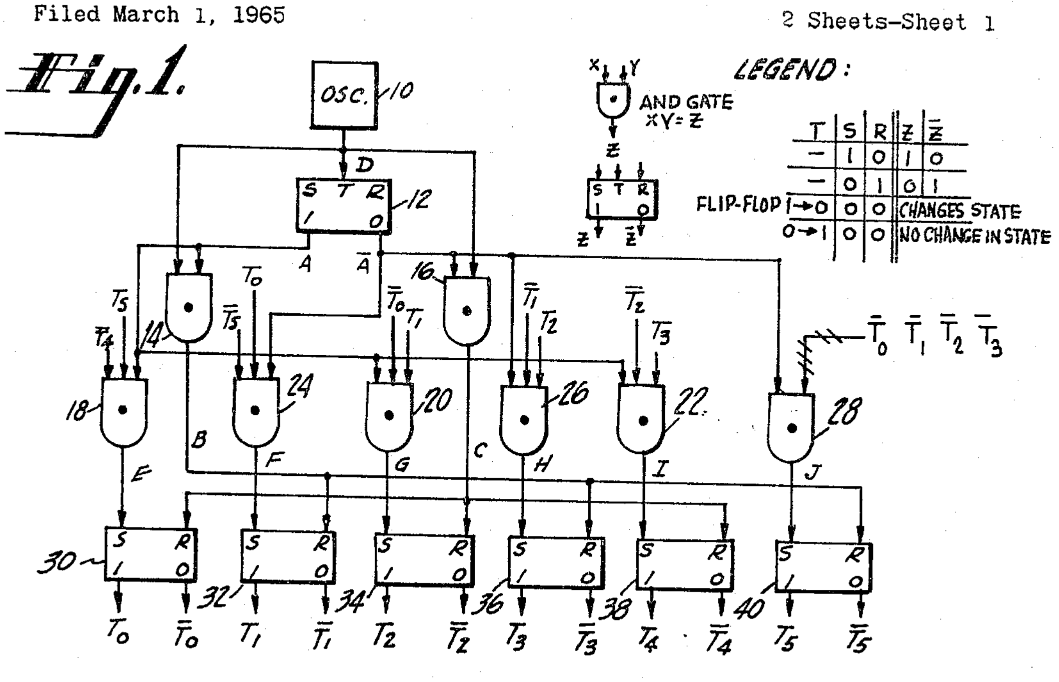
FIGURE 1 is a block circuit diagram of one form of the present invention.

The circuit of FIGURE 1 includes a square wave oscillator 10 whose output is applied to the trigger terminal of a triggerable flip-flop 12 and to one input of AND gates 14 and 16. The 1 output terminal of triggerable flip-flop 12 is connected to AND gates 14, 18, 20 and 22. The 0 output terminal of flip-flop 12 is connected to AND gates 16, 24, 26 and 28.

The outputs of AND gates 18, 24, 20, 26, 22 and 28 are applied to tthe respective set terminals (S) of flip-flops 30, 32, 34, 36, 38 and 40. AND gate 14 applies its output to the reset terminal (R) of alternate flip-flops 32, 36 and 40. AND gate 16 applies its output to the reset terminals of the remaining flip-flops 30, 34, and 38.

The conventions adopted for the various gates are given in the legend for FIGURE 1. While expressed in Boolean terms, it is to be understood that a particular voltage level, such as a relatively high voltage level, may represent the binary digit (bit) 1 and a second level, such as a relatively low signal level, may represent the bit 0. The truth table adjacent to the flip-flop of the legend describes its operation. The first two lines of the table describe the operation of the set-reset flip-flops 30–40. The entire table describes the operation of the triggerable flip-flop 12.

Figure 3:
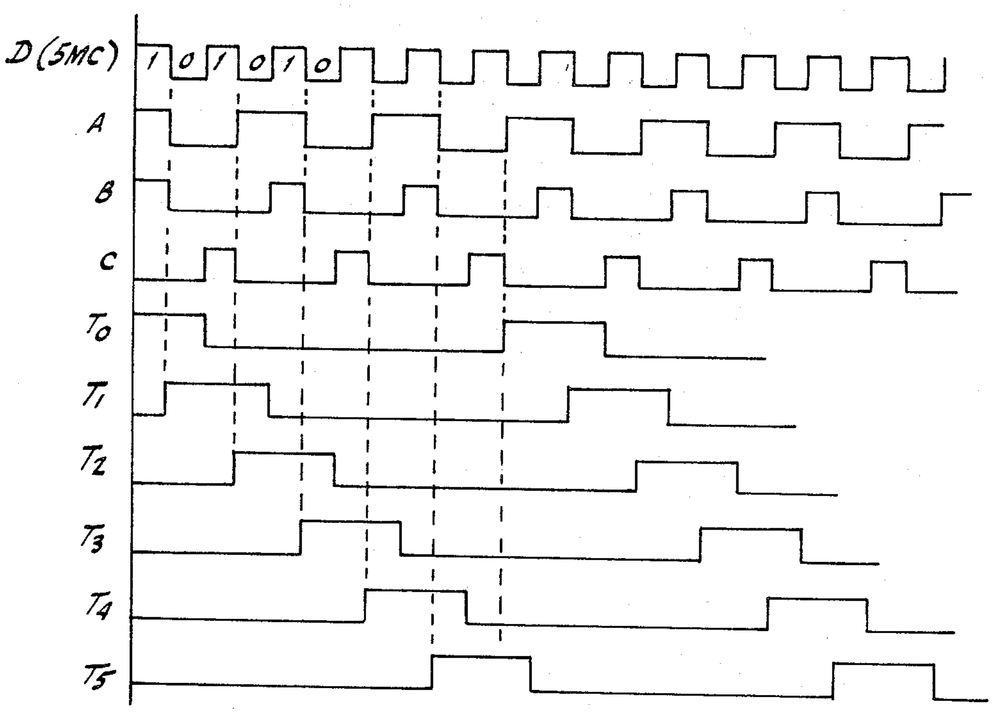
FIGURE 3 is a drawing of the waveforms, in somewhat idealized form, at different points in the circuit of FIGURE 1.

The truth table of FIGURE 2 completely describes the operation of the circuit of FIGURE 1. The oscillator 10 produces a square wave output as shown in FIGURE 3 at a frequency of say 5 megacycles. The triggerable flip-flop 12 produces a square wave output at one-half this frequency. AND gate 14, which receives the output A of flip-flop 12 and the square wave output D of the oscillator 10, produces a positive pulse B (a signal indicative of the bit 1) concurrently with each first, third, fifth, and so on, positive-going portion of the square wave D. In a similar manner, AND gate 16 produces a positive pulse C concurrently with each second, fourth, sixth, and so on, positive-going portion of the square wave D.

Each AND gate, other than the last one 28, receives as inputs the signals appearing at the 1 output terminal of the preceding flip-flop and the 0 output terminal of tthe next preceding flip-flop. For example, AND gate 20 receives as inputs the signals at the 1 output $T_1$ of flip-flop 32 and the 0 output $\overline{T}_0$ of the flip-flop 30. It is to be understood here that the first and second AND gates 18 and 24, of course, receive inputs from the last and next-to-the-last flip-flops in one case, and the last and first flip-flops in the other case. In other words, the flip-flop preceding flip-flop 30 is construed to be the last flip-flop and so on. The last AND gate 28 receives as inputs the signals at the 0 output terminals of all flip-flops other than the one directly preceding the last flip-flop. Thus, AND gate 28 receives as inputs $\overline{T}_0$, $\overline{T}_1$, $\overline{T}_2$ and $\overline{T}_3$.

It may be assumed that flip-flop 40 is initially in the 1 state ($T_5=1$, $\overline{T}_5=0$) and all remaining flip-flops are in the 0 state. If, at that time, $D=0$ and $A=1$, then $B=0$ and $C=0$. AND gate 18 becomes enabled (its three inputs $\overline{T}_4$, $T_5$ and A are all 1) and E changes to 1, setting flip-flop 30. $T_0$ therefore changes to 1 and $\overline{T}_0$ changes to 0.

During the next half-cycle, D changes to 1 causing B to change to 1. When B changes to 1, flip-flop 40 is reset and $T_5$ changes to 0. This causes E to change to 0.

During the next half-cycle, D changes to 0 and this causes the triggerable flip-flop 12 to change state. $\overline{A}$ changes to 1. $\overline{T}_5$ is 1 and $T_0$ is also 1, so that AND gate 24 becomes enabled. The output of this AND gate sets flip-flop 32, changing $T_1$ to 1.

The various waveforms which occur at different points in the circuit appear in FIGURE 3. Note that the last third of each timing pulse overlaps the next occurring timing pulse.

While illustrated in terms of AND gates, it is to be appreciated that the circuit of the present invention can use other types of coincidence gates instead. For example, with minor circuit redesign NAND gates or NOR gates may be employed. Similarly, while in the present circuit the convention is adopted that a positive signal sets the flip-flop and a positive signal applied to the other input terminal resets the flip-flop, other generally available circuits would be acceptable. As one example, in one practical circuit, flip-flops were employed which required a negative signal to reset the flip-flop rather than the positive signal shown. Such signals are readily available from standard coincidence gates, such as NAND gates substituted for AND gates 14 and 16.

In the embodiment of the invention illustrated, the last AND gate 28 is primed by the 0 output signal of the first four flip-flops rather than by the 1 output signal of the preceding flip-flop 38 and the 0 output signal of the next preceding flip-flop 36. The reason is to prevent the spurious generation of trains of simultaneously occurring timing pulses upon initial start-up. When power is first turned on, it is difficult to predict which flip-flops will assume a set or a reset condition. It is conceivable that, for example, flip-flops 34 and 38 would initially tend both to be set. If this did occur and if AND gate 28 received inputs $T_4$ and $\overline{T}_3$ rather than the inputs shown, then in response to the next occurring input $\overline{A}=1$, the pulses $T_3$, $T_5$ would be produced. In the same way, the next timing pulse $A=1$ would cause pulses $T_0$ and $T_4$ to be produced and so on. Such operation is not possible with the circuit connected as shown. Pulse $T_5$ can be produced only after flip-flops 30, 32, 34 and 36 are reset and therefore even if two flip-flops initially should become spuriously set, the cycle of double pulses produced would be broken at flip-flop 40.

Another feature of the invention is the relatively short delay between each clock pulse and the setting or resetting of a flip-flop. The time $\Delta t$ between the leading edge of an $A=1$ (or $\bar{A}=1$) pulse and the time a pulse is applied to the set (S) terminal of a flip-flop is the delay inserted by a single AND gate. The time between the leading edge of a $D=1$ pulse and the time a pulse is applied to the reset (R) terminal of a flip-flop is also only that inserted by a single AND gate.

Another feature of the invention is the overlapping of the lagging portion of each timing pulse by the leading portion of the succeeding timing pulse. This provides the logic designer with a relatively large selection of time periods which can be chosen for performing different control functions. For example, the short period in which $T_1=T_2=1$ may be selected by applying both signals to an AND gate; a longer period having a duration from the leading edge of $T_0$ to the lagging edge of $T_2$ may be selected by applying $T_0$, $T_1$ and $T_2$ to an OR gate, and so on.

What is claimed is:

1. A timing pulse generator comprising, in combination:

a group of two-state circuits, each circuit having two input terminals and two output terminals and each circuit, when placed in a first state by a signal applied to one input terminal, producing a signal representing the bit "0" at one output terminal and a signal representing the bit "1" at its other output terminal and, when placed in its second state by a signal applied to its other input terminal, producing at its two output terminals signals complementary to the output signals above;

a group of coincidence gates, one per two-state circuit, each gate connected to the same input terminal of its two-state circuit;

means for applying to each gate signals from two-state circuits other than the one to which the gate is connected for priming the successive gates in sequence;

means for applying to each gate, when it is primed, an enabling signal for causing the gate to apply a signal to its two-state circuit for changing the state of that circuit from its first to its second state; and means coupled to the other input terminals of said two-state circuits for changing the state of each circuit from its second to its first state a fixed interval after the succeeding two-state circuit has switched to its second state, whereby overlapping timing pulses of the same duration are generated at the output terminals of said two-state circuits.

2. A timing pulse generator comprising, in combination:

a group of two-state circuits, each circuit having two input terminals and two output terminals and each circuit, when placed in a first state by a signal applied to one input terminal, producing a signal representing the bit "0" at one output terminal and a signal representing the bit "1" at its other output terminal and, when placed in its second state by a signal applied to its other input terminal, producing at its two output terminals signals complementary to the output signals above;

a group of coincidence gates, one per two-state circuit, each gate connected to the same input terminal of its two-state circuit;

means for applying to each gate signals from two-state circuits other than the one to which the gate is connected for priming the successive gates in sequence;

means including a periodic signal source, and means for deriving from said source two groups of complementary, time-sequential signals, for applying to each gate, when it is primed, an enabling signal for causing said gate to apply a signal to its two-state circuit for changing the state of that circuit from its first to its second state; and coincidence gate means connected to receive signals from the periodic source and said time-sequential signals, coupled to the other input terminals of said two-state circuits for changing the state of each circuit from its second to its first state during the time said circuit is in its second state and a fixed interval after the succeeding two-state circuit was switched to its second state, whereby overlapping timing pulses of the same duration are generated at the output terminals of said two-state circuits.

3. A timing pulse generator comprising, in combination:

a group of two-state circuits, each circuit having two input terminals and two output terminals and each circuit, when placed in a first state by a signal applied to one input terminal, producing a signal representing the bit "0" at one output terminal and a signal representing the bit "1" at its other output terminal and, when placed in its second state by a signal applied to its other input terminal, producing at its two output terminals signals complementary to the output signals above;

a group of coincidence gates, one per two-state circuit, each gate connected to the same input terminal of its two-state circuit;

means for applying to each gate signals from two-state circuits other than the one to which the gate is connected for priming the successive gates in sequence;

a periodic signal source;

means for deriving from said source two groups of time-sequential signals, one group of signals the complement of the other, and both groups of signals at one-half the source frequency, and for applying to each gate, when it is primed, an enabling signal for causing the gate to apply a signal to its two-state circuit for changing the state of that circuit from its first to its second state; and two coincidence gates, one receiving both signals from said source and one group of the time-sequential signals, and the other receiving both signals from said source and the other group of time-sequential signals, one gate coupled to the other input terminals of alternate ones of the two-state circuits for changing the state of each circuit from its second to its first state a predetermined interval after the succeeding two-state circuit has switched to its second state and the second coincidence gate coupled to the other input terminals of the remaining two-state circuits for changing the state of each circuit from its second to its first state a predetermined interval after the succeeding two-state circuit has switched to its second state.

4. A timing pulse generator comprising, in combination:

a group of flip-flops, each having set and reset input terminals and 1 and 0 output terminals;

a group of coincidence gates, one per flip-flop, each gate connected to the set terminal of its flip-flop;

means for applying to each gate output signals from flip-flops other than the one to which the gate is connected for priming the successive gates in sequence;

means for applying to each gate, when it is primed, an enabling signal for causing the gate to apply a set signal to its flip-flop; and means coupled to the reset terminals of all flip-flops for resetting each flip-flop during the time the succeeding flip-flop is in its set state and a fixed interval after said succeeding flip-flop has reached its set state, whereby overlapping timing pulses of the same duration are generated at the output terminals of said two-state circuits.

5. A timing pulse generator comprising, in combination:

a group of flip-flops, each having set and reset input terminals and 1 and 0 output terminals;

a group of coincidence gates, one per flip-flop, each gate connected to the set terminal of its flip-flop;

means for applying to each gate output signals from flip-flops other than the one to which the gate is connected for priming the successive gates in sequence;

means including an oscillator and a triggerable flip-flop connected to said oscillator for applying to each gate, when it is primed, an enabling signal for causing the gate to apply a set signal to its flip-flop; and means including coincidence gate means connected to said oscillator and triggerable flip-flop and coupled to the reset terminals of all remaining flip-flops for resetting each flip-flop during the time the succeeding flip-flop is in its set state and a predetermined interval after said succeeding flip-flop has reached its set state.

6. A timing pulse generator comprising, in combination:

a group of $n$ flip-flops including at least a first, $n-1$th and $n$th flip-flop, each flip-flop having set and reset input terminals and 1 and 0 output terminals, where $n$ is an integer at least equal to 3;

a group of $n$ AND gates including at least a first, second and $n$th such gate, one gate per flip-flop, each gate connected to the set terminal of its flip-flop;

means for applying to the first gate the 1 output signal of the $n$th flip-flop and the 0 output signal of the $n-1$th flip-flop;

means for applying to the second gate the 1 output signal of the first flip-flop and the 0 output signal of the $n$th flip-flop;

means for applying to the $n$th gate, the 0 output signal of all flip-flops except the $n-1$th flip-flop;

means for applying to each remaining gate the 1 output signal of the flip-flop preceding the one to which the gate is connected and the 0 output signal of the next preceding flip-flop;

means for applying to each gate, when it is primed, an enabling signal for causing the gate to apply a set signal to its flip-flop; and means coupled to the reset terminals of all flip-flops for resetting each flip-flop during the time the succeeding flip-flop is in its set state and a predetermined interval after said succeeding flip-flop has reached its set state.

References Cited

UNITED STATES PATENTS

| | | | |
|---|---|---|---|
| 3,107,332 | 10/1963 | Paoletti et al. | 328—63 |
| 3,162,815 | 12/1964 | Mogensen | 328—62 |

ARTHUR GAUSS, *Primary Examiner.*

J. ZAZWORSKY, *Assistant Examiner.*